2 Sheets—Sheet 1.
J. J. URMSTON.
Turning Regular Forms.
No. 101,548. Patented Apr. 5, 1870.
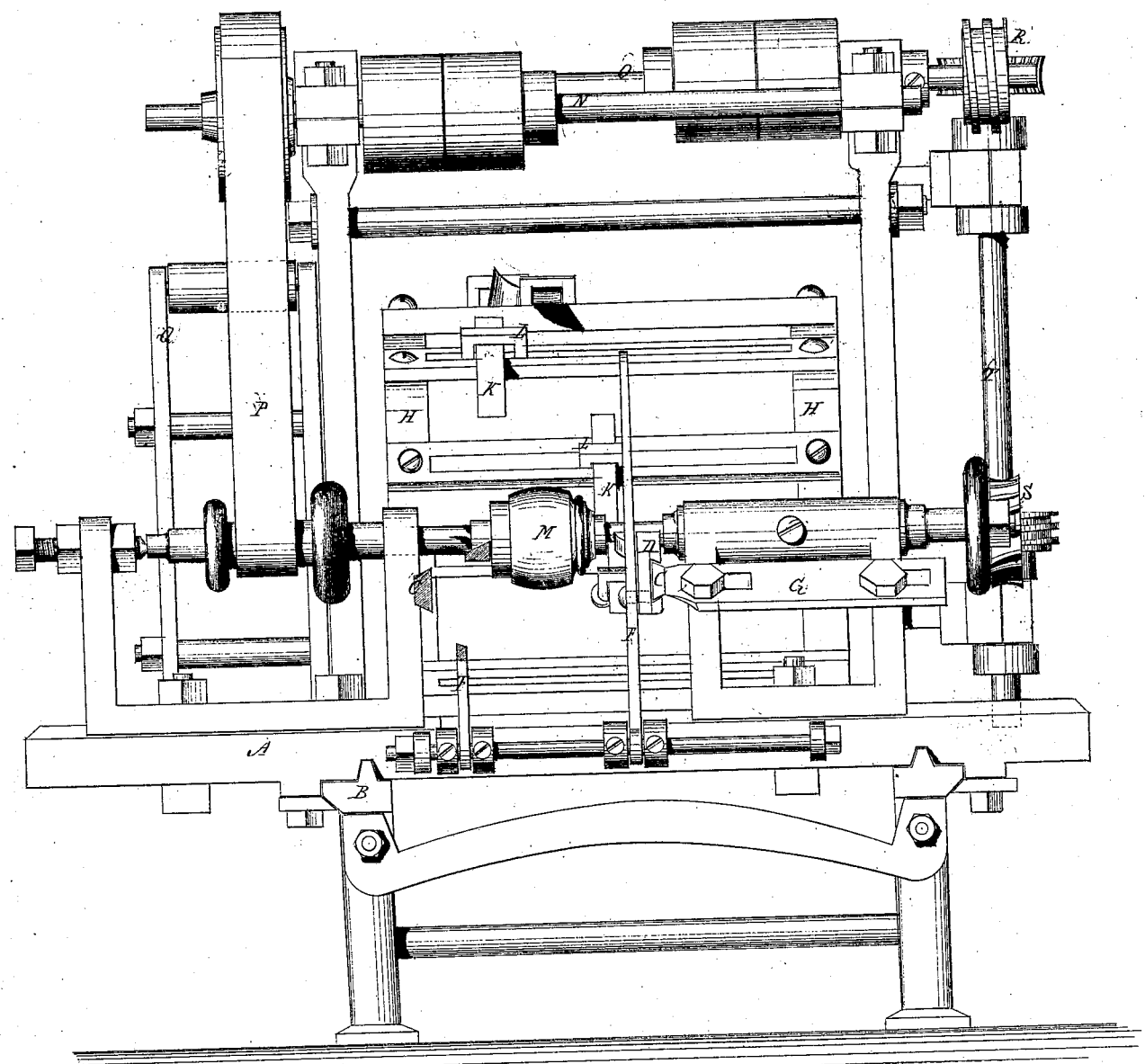
Witnesses.
Chas. Nida
Geo. W. Mabe
Inventor
J. J. Urmston
per Mmm
Attorneys.
N. PETERS, PHOTO-LITHOGRAPHER, WASHINGTON, D. C.

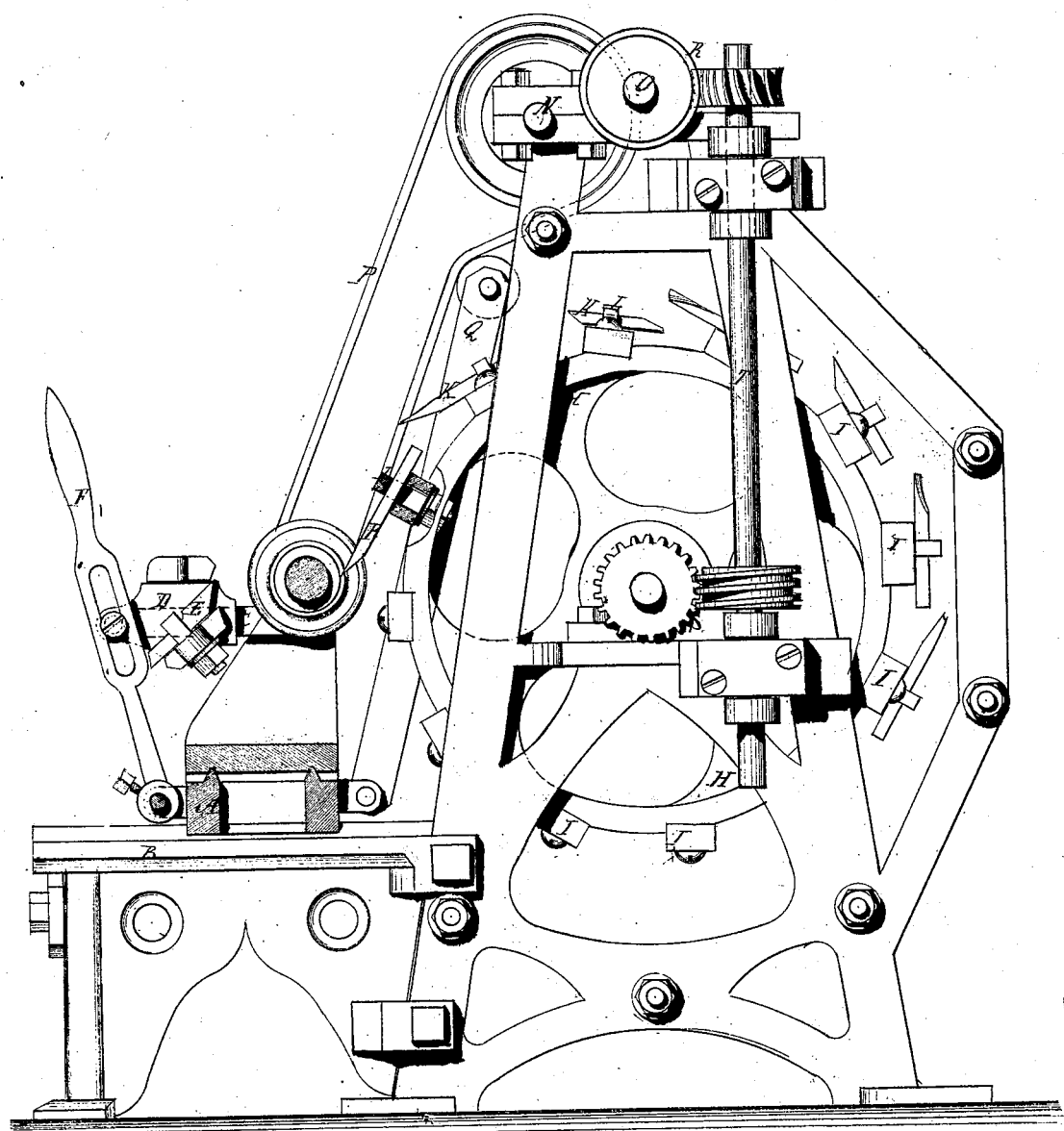

United States Patent Office.

JOHN J. URMSTON, OF RAHWAY, NEW JERSEY.

Letters Patent No. 101,548, dated April 5, 1870.

---

IMPROVEMENT IN WOOD-TURNING LATHE.

---

The Schedule referred to in these Letters Patent and making part of the same

---

*To all whom it may concern:*

Be it known that I, JOHN J. URMSTON, of Rahway, in the county of Union and State of New Jersey, have invented a new and improved Wood-Turning Lathe; and I do hereby declare that the following is a full, clear, and exact description thereof, which will enable others skilled in the art to make and use the same, reference being had to the accompanying drawings forming part of this specification.

The object of this invention is to provide turning-lathes for turning wagon-hubs and other like articles in a manner to cause less strain on the working parts, and more expeditiously and economically than can be done by the machines now in use.

The invention consists in the combination with an ordinary lathe of a large slowly-revolving drum or cylinder, parallel with the spindles of the lathe, and carrying cutters, against which the block in the lathe is revolved at great rapidity, and reduced to the required form, each of the said cutters being arranged for its special part of the work, which it accomplishes wholly at one operation, and only one tool is in operation at a time, one moving up to the work as the preceding tool passes away. The said tools are adjustable on the cylinder for turning different articles, and the lathe is adjustable to or from the cylinder. It is also provided with sliding tools for cutting off the ends of the work.

Figure 1 represents a front elevation of my improved machine, partly sectioned.

Figure 2 represents a side elevation, also partly sectioned.

Similar letters of reference indicate corresponding parts.

The bed-frame or shears of the lathe is placed on ways on a frame, B, so as to be adjusted laterally thereon, and both head and tail-stock are provided with ways C, whereon sliding stocks D are arranged for carrying cut-off tools E, for cutting off and squaring the ends of blocks held by the spindles.

These slides are moved by hand-levers F in the usual way.

The support G on the tail-stock for the cutting-off tool is adjustable for varying the length of the blocks.

H represents the tool-carrying drum or cylinder, on the periphery of which are placed, at regular intervals, slotted clamping-bars I, suitably pitched to cause the tools K, which are clamped to them by yokes L, to project sufficiently in advance to reduce the blocks as required.

These tools are designed to be adjusted relatively to each other, so that each will, in passing the block M, perform its required share of the work in reducing and shaping the said block.

As many tools as preferred may be used, and the work may be divided between them in any way.

The end-cutting and squaring tools may also be placed on this drum, if preferred. One revolution of the drum completes the turning of the block acted upon.

The yokes L are provided with clamping-screws and nuts on the inner faces of slotted bars.

N and O represent countershafts on the top of the frame for driving the lathe-spindle and the drum.

The former drives the live head of the lathe by a belt, P, which is required to be loose to admit of adjusting the lathe-shears to or from the drum, and a belt-tightener, Q, is provided for taking up the slack when in operation.

The drum is driven by worm-gears R S and a vertical shaft, T.

This mode of operation is preferable to the common mode of turning hubs and other like articles, with sliding tools adapted to act on the whole length at once, and moved up to the block in ways, which is necessarily very straining on the working parts, and liable to split the blocks and to throw them out of the centers; whereas by my improved plan the work may be divided between as many tools as preferred, and yet be as expeditious, or more so, than the old way, the drum being arranged to turn a whole revolution as soon or sooner than the sliding tool can accomplish the work, which is necessarily slow when done by the said sliding tool, in consequence of cutting along the whole length of the article being turned at once, or nearly so.

Having thus described my invention,

I claim as new and desire to secure by Letters Patent—

1. The combination of a series of knives arranged on a slowly-rotating tool-stock, as set forth, and the centers rotating the block against each knife, successively, with great velocity, each revolution of the tool-stock serving to finish a hub, in the manner described.

2. The combination of the slotted bars I of the drum, the clamp L, and the tools K, when arranged substantially as specified.

The above specification of my invention signed by me this 21st day of June, 1869.

J. J. URMSTON.

Witnesses:
FRANK BLOCKLEY,
ALEX. F. ROBERTS.